United States Patent [19]

Araki

[11] Patent Number: 5,559,408
[45] Date of Patent: Sep. 24, 1996

[54] APPARATUS FOR CONTROLLING A MOTOR USING PIEZOELECTRIC RESISTANCE

[75] Inventor: Toru Araki, Itami, Japan

[73] Assignee: Mitsubishi Denki Kabushiki Kaisha, Tokyo, Japan

[21] Appl. No.: 561,392

[22] Filed: Nov. 21, 1995

Related U.S. Application Data

[62] Division of Ser. No. 44,076, Apr. 6, 1993, which is a continuation of Ser. No. 973,534, Nov. 9, 1992, abandoned, which is a continuation of Ser. No. 714,712, Jun. 3, 1991, abandoned.

[30] Foreign Application Priority Data

Aug. 31, 1990 [JP] Japan .................. 2-228011

[51] Int. Cl.⁶ .................................................... G01L 3/02
[52] U.S. Cl. ............... 318/271; 73/862.192; 73/862.338
[58] Field of Search .............................. 318/271, 90, 87, 318/276, 278, 456; 382/848, 849, 853; 73/862.192, 862.322, 862.338, 862.193, 862.195, 862.46, 862.474, 862.61, 862.627

[56] References Cited

U.S. PATENT DOCUMENTS

| | | | |
|---|---|---|---|
| 3,201,982 | 8/1965 | Kennedy | 73/862.338 |
| 4,023,864 | 5/1977 | Lang et al. | 180/103 BF |
| 4,152,930 | 5/1979 | Fujimoto et al. | 73/136 R |
| 4,312,241 | 1/1982 | Budraitis | 73/862.338 |
| 4,724,711 | 2/1988 | Sakakibara et al. | 73/862.338 |
| 4,838,077 | 6/1989 | Shifflet et al. | 73/862.19 |
| 5,215,154 | 6/1993 | Kirby | 73/862.322 |

*Primary Examiner*—Jonathan Wysocki
*Attorney, Agent, or Firm*—Leydig, Voit & Mayer

[57] ABSTRACT

A method of controlling operation of a DC motor including the steps of detecting the level of acceleration caused by the rotation of the output shaft of the DC motor; determining the square root of the detected level of acceleration; and supplying the DC motor with a driving voltage which is determined in accordance with the difference between the square root of the acceleration and a voltage command. This method is carried out by an apparatus which includes a power supply for supplying an electric power to the DC motor; a rotary member rotatable in accordance with the rotation of the output shaft of the DC motor; an acceleration sensor provided on the rotary member for detecting the acceleration of acting on the rotary member; a square root circuit for computing the square root of the output from the acceleration sensor; and a differential amplifier circuit for supplying the DC motor with a voltage which is determined in accordance with the difference between the voltage of the power supply and the output voltage of the square root circuit.

4 Claims, 3 Drawing Sheets

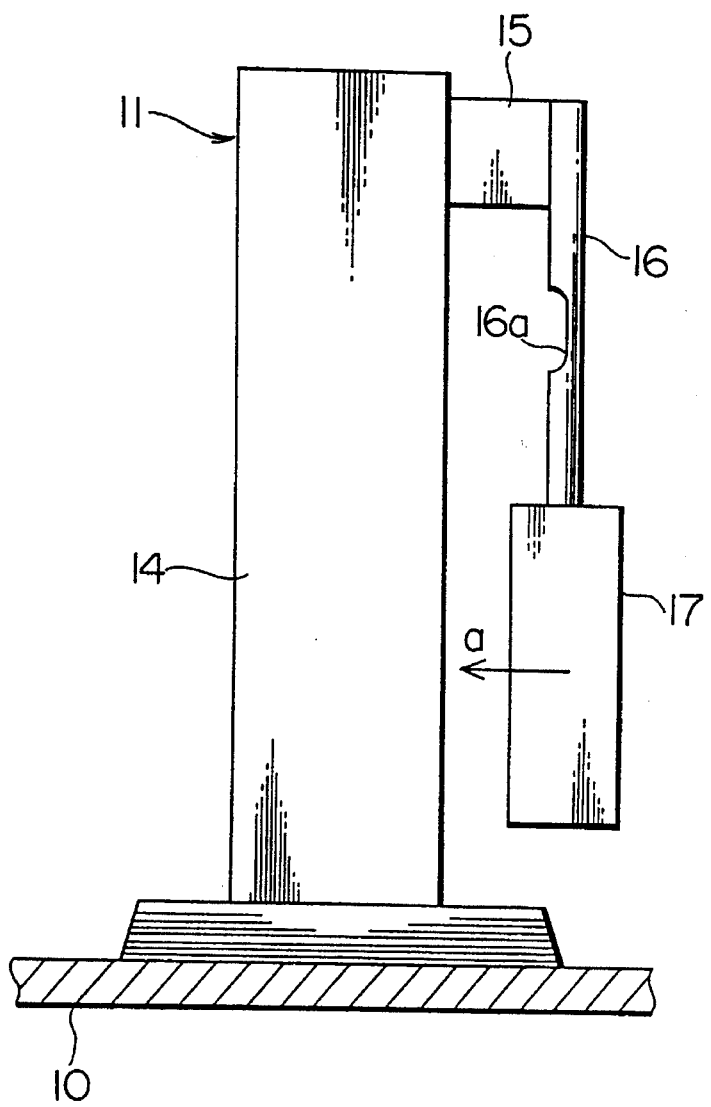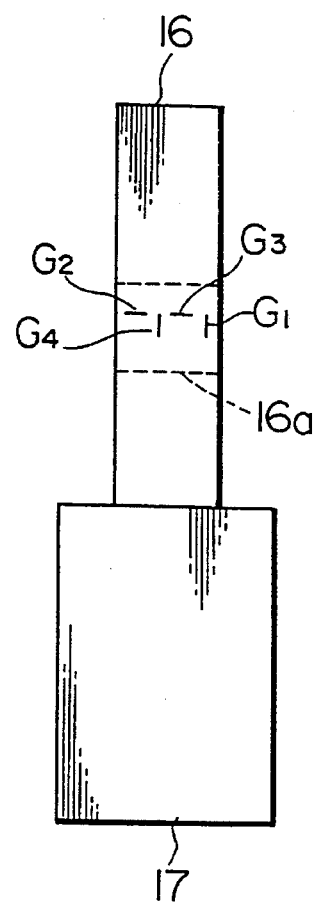
FIG.2
FIG.3

APPARATUS FOR CONTROLLING A MOTOR USING PIEZOELECTRIC RESISTANCE

This disclosure is a division of patent application Ser. No. 08/044,076, filed Apr. 6, 1993, which is a continuation of prior patent application Ser. No. 07/973,534, filed on Nov. 9, 1992, now abandoned, which is a continuation of prior patent application Ser. No. 07/714,712, filed Jun. 3, 1991, now abandoned.

BACKGROUND OF THE INVENTION

1. Field of the Invention

The present invention relates to a method of controlling a D.C. motor by using piezoelectric resistance effect exhibited by a semiconductor and also to an apparatus which performs such a control.

2. Description of the Related Art

FIG. 5 illustrates a conventional motor control apparatus. The apparatus has a disk 3 connected to the drive shaft 2 of a DC motor 1. The disk 3 is provided with a multiplicity of slits 3a arranged along the outer peripheral end of the disk 3 at a constant circumferential pitch. A photo-interrupter 4 is disposed in the vicinity of the disk 3 so as to oppose the slits 3a. An integrator 7 is connected to the photo-interrupter 4 through an amplifier 5 and a monostable circuit 6. The integrator 7, as well as a power supply 9, is connected to a differential amplifier circuit 8 for controlling the voltage applied to the motor 1.

In operation, the motor 1 is supplied with a certain level of voltage applied by the power supply 9 through the differential amplifier circuit 8. As the motor 1 is started, the disk 3 is rotated by the drive shaft 2 connected to the motor 1, so that a pulse train $P_A$ indicative of the presence or absence of the slits 3a is output from the photo-interrupter 4. The pulse train $P_A$, which is amplified by the amplifier 5, is input to the monostable circuit 6 as a trigger pulse. In consequence, a pulse train $P_B$, having a frequency proportional to the speed of the motor 1 and having a constant high-level period, is delivered to the integrator 7.

If the time constant of the integrator 7 is sufficiently greater than the period T of the pulse train $P_B$, a DC voltage $V_0$ expressed by the following formula is delivered from the integrator 7.

$$V_0 = \alpha \cdot t_p / T = \alpha \cdot t_p \cdot f \quad (1)$$

where, $\alpha$ represents a constant, $t_p$ represents the high-level period of the pulse train $P_B$ and f represents the frequency of the pulse train $P_B$.

In formula (1) above, since $\alpha$ and $t_p$ are constant, the D.C. voltage $V_0$ output from the integrator 7 varies in proportion to the frequency f of the pulse train $P_B$, i.e., the speed of rotation of the motor 1. Then, the difference between the voltage supplied by the power supply 9 and the output level of the integrator 7 is amplified by the differential amplifier 8 and supplied to the motor 1.

Therefore, an increase in the speed of the motor 1 causes the output of the integrator 7 to increase correspondingly, with the result that the output of the differential amplifier 8 is lowered to reduce the speed of the motor 1. Conversely, a reduction in the speed of the motor 1 causes the output from the integrator 7 to decrease correspondingly, so that the level of the output from the differential amplifier 8 becomes higher to increase the speed of the motor 1.

Thus, the speed of the DC motor 1 is controlled in accordance with the voltage from the power supply 9.

In this known motor control apparatus, however, a problem is encountered in that the motor speed cannot be set with good response when the motor is started up or when the command speed of the motor is changed, because the response characteristic of the motor control is determined by the time constant of the integrator 7.

Another problem is that, when the interval between successive pulses of the pulse train $P_B$ is large due to low speed of operation of the motor 1 or a large distance between adjacent slits 3a in the disk 3, a ripple is caused in the output of the integrator 7 so as to impede smooth control of the motor. This problem would be overcome by setting the time constant of the integrator 7 to a large value. In such a case, however, the response characteristic of the control system responding to a variation in the motor speed is impaired undesirably.

SUMMARY OF THE INVENTION

Accordingly, an object of the present invention is to provide a method of and an apparatus for controlling a motor which allows for smooth motor operation and improved response characteristics.

To this end, according to one aspect of the present invention, there is provided a method of controlling operation of a DC motor comprising the steps of: detecting the level of acceleration caused by the rotation of the output shaft of the DC motor; determining the square root of the detected level of acceleration; and supplying the DC motor with a driving voltage which is determined in accordance with the difference between the square root of the acceleration and a voltage command.

According to another aspect of the present invention, there is provided an apparatus for controlling the operation of a DC motor comprising: a power supply for supplying an electric power to the DC motor; a rotary member rotatable in accordance with the rotation of the output shaft of the DC motor; an acceleration sensor provided on the rotary member for detecting the acceleration of acting on the rotary member; a square root circuit for computing the square root of the output from the acceleration sensor; and a differential amplifier circuit for supplying the DC motor with a voltage which is determined in accordance with the difference between the voltage of the power supply and the output voltage of the square root circuit.

BRIEF DESCRIPTION OF THE DRAWINGS

FIGS. 2 and 3 are a front elevational view and a side view showing the mechanical construction of an acceleration sensor used in the embodiment shown in FIG. 1;

DESCRIPTION OF THE PREFERRED EMBODIMENT

A preferred embodiment of the present invention will be described with reference to the accompanying drawings.

Figure 1:
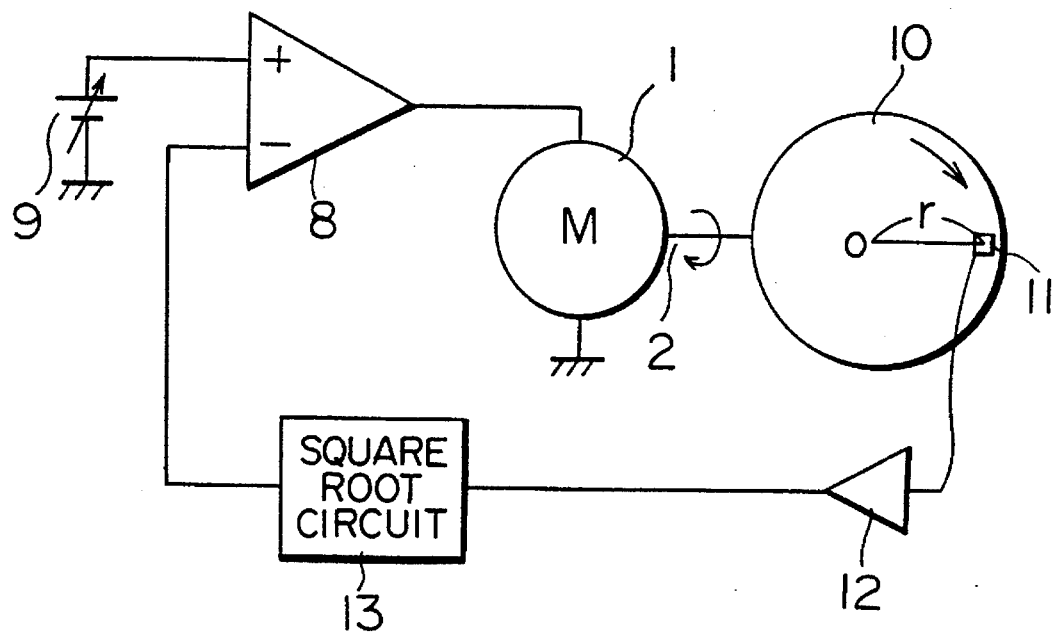
FIG. 1 is a block diagram of an embodiment of the motor control apparatus in accordance with the present invention.

Referring to FIG. 1, a disk 10 is connected to a rotor shaft (referred to as "drive shaft", hereinafter) 2 of a DC motor 1. The disk 10 is therefore rotated about its axis or center O as the drive shaft 2 rotates. An acceleration sensor 11 is attached to a portion of the disk 10 at a position which is spaced by a distance r from the center O so as to rotate as a unit with the disk 10. An amplifier 12 is electrically connected to the acceleration sensor 11. A square root circuit 13 is connected to the amplifier 12. The square root circuit 13 is adapted for computing the square root of the output from the amplifier 12.

The output of the square root circuit 13 is connected to a negative input terminal of the differential amplifier circuit 8 a positive input terminal of which is connected to a power supply 9. The output of the differential amplifier 8 is connected to the DC motor 1.

The acceleration sensor 11 is of the type which utilizes piezoelectric resistance effect of a semiconductor. As shown in FIG. 2, the acceleration sensor 11 has a post 14 attached to the disk 10, a bracket 15 secured to the free end of the post 14, an arm 16 made of a semiconductor such as silicon attached to the bracket 15, and a weight 17 connected to the free end of the arm 16. The arm 16 has a diaphragm portion 16a on the rear side of which are formed four strain gauges $G_1$ to $G_4$ as shown in FIG. 3. The acceleration sensor 11 is secured to the disk 10 such that a centrifugal acceleration A acts on the weight 17 as indicated by an arrow in FIG. 2, in accordance with the rotation of the disk 10.

Figure 4:
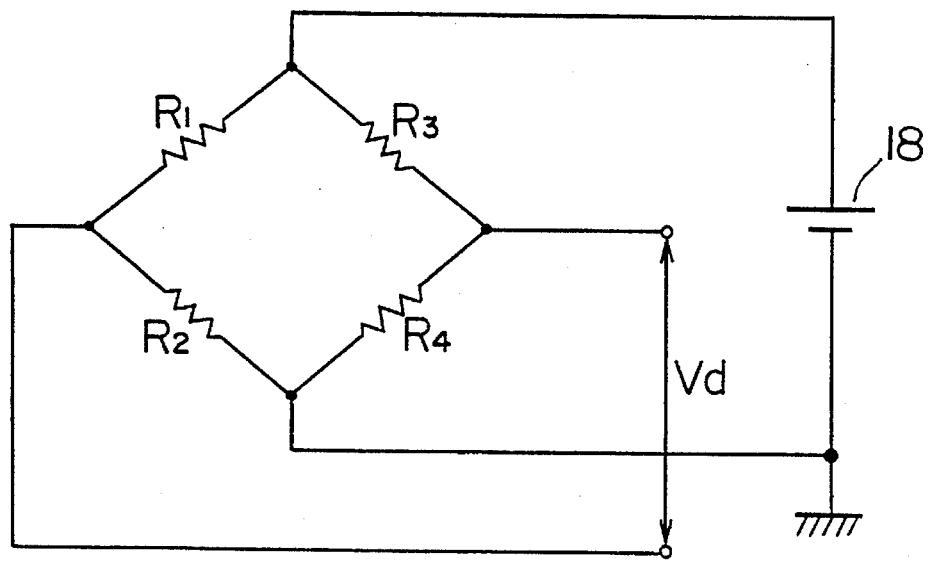
FIG. 4 is a circuit diagram showing the circuit arrangement of the acceleration sensor used in the embodiment.
Figure 5:
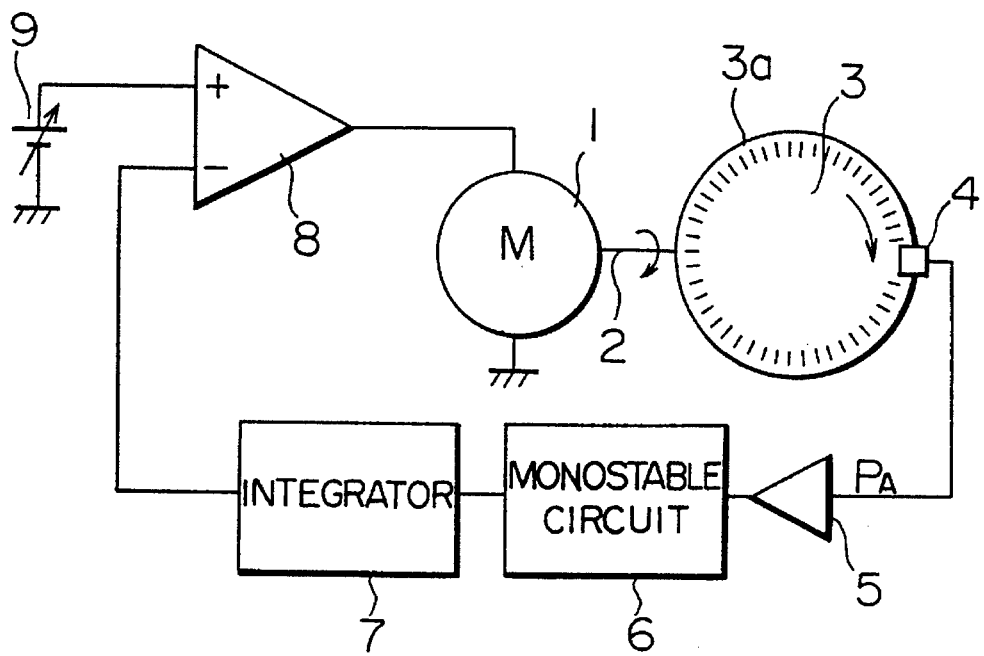
FIG. 5 is a block diagram of a known motor control apparatus.

Wires (not shown) are connected to the strain gauges $G_1$ to $G_4$ so as to form an electric circuit as shown in FIG. 4, where $R_1$ to $R_4$ designate the resistance values of the strain gauges $G_1$ to $G_4$. In FIG. 4, reference numeral 18 denotes a power supply. The strain gauges $G_1$ to $G_4$ are so constructed that the resistance values $R_1$ to $R_4$ are equal when there is no strain of the arm 16. The strain gauges $G_1$ and $G_4$ are formed so as to extend in the direction of length of the arm 16, while the strain gauges $G_2$ and $G_3$ are formed to extend in the breadthwise direction of the arm 16. Therefore, when the arm 16 is strained by the acceleration a acting on the weight 17 as shown in FIG. 2 caused by the rotation of the disk 10, the resistance values $R_1$ and $R_4$ of the strain gauges $G_1$ and $G_4$ are increased by an amount ΔR corresponding to the strain, due to piezoelectric resistance effect. Conversely, the resistance values $R_2$ and $R_3$ of the strain gauges $G_2$ and $G_3$ are reduced by ΔR. When the acceleration a is zero, i.e., when no strain is caused of the arm 16, the output voltage Vd shown in FIG. 4 is zero. However, when the acceleration a is applied to the weight 17 as shown in FIG. 2 in accordance with the rotation of the disk 10, the output voltage Vd takes a value proportional to the acceleration a.

A detailed description will be given of the operation of this embodiment. When a certain level of voltage is applied to the DC motor 1 by the power supply 9 through the differential amplifier circuit 8, the DC motor 1 starts to operate to rotatingly drive the disk 10 through the drive shaft 2. As a result, the acceleration sensor 11 makes a revolution at a tangential velocity v so that an acceleration a expressed by the following formula (2) is generated to act on the weight 17.

$$a = v^2/r \qquad (2)$$

The angular velocity ω of the disk 10 is then expressed by the following formula (3).

$$\omega = v/r \qquad (3)$$

From the formulae (2) and (3), the angular velocity is given as follows.

$$\omega = (a/r)^{1/2} \qquad (4)$$

Thus, the angular velocity ω of the disk 10 is proportional to the square root of the centrifugal acceleration a, i.e., to $a^{1/2}$.

The output from the acceleration sensor 11, proportional to the centrifugal acceleration a, is amplified by the amplifier 12 and is then input to the square root circuit 13 which computes the square root of the output from the amplifier 12. Consequently, an output proportional to the angular velocity ω, i.e., proportional to the speed of the DC motor 1, is derived from the square root circuit 13.

Then, the difference between the output of the square root circuit 13 and the voltage from the power supply 9 is computed by the differential amplifier circuit 8 and is then supplied to the DC motor 1.

According to this embodiment, a rise in the speed of the DC motor 1 causes the output from the acceleration sensor 11 and, hence, the output from the square root circuit 13 to be increased, so that the output from the differential amplifier circuit 8 is decreased to reduce the speed of the motor 1. Conversely, a reduction in the speed of the DC motor causes the outputs of the acceleration sensor 11 and the square root circuit 13 to be decreased, so that the output from the differential amplifier circuit 8 is increased to increase the speed of the DC motor 1. The acceleration sensor 11 can instantaneously respond to a change in the angular velocity of the disk 10, so that the speed of the DC motor 1 can be smoothly controlled with good response characteristic.

In the illustrated embodiment of the present invention, the acceleration sensor 11 is attached to the disk 10. The use of a disk 10, however, is not essential and the acceleration sensor 11 may be attached to another type of member, e.g., a bar-shaped member, which rotates in accordance with the operation of the DC motor 1.

It is also possible to arrange such that the square root of the output from the acceleration sensor 11 is computed by means of a computer.

What is claimed is:

1. A device for measuring acceleration comprising:

a rotary member;

a coupling mechanism attached to said rotary member;

an arm member having first and second ends, the first end being fixed to said coupling mechanism, the arm member including a semiconductor material having a length and a breadth;

a weight attached to the second end of said arm member; and a plurality of strain gauges formed on said arm member wherein at least one of the plurality of strain gauges extends along the length of the arm member and at least one of the strain gauges extends across the breadth of said arm member, each strain gauge having a resistance that changes as said arm member is displaced due acceleration acting on said weight from rotation of said rotary member.

2. The device for measuring acceleration claimed in claim 1 wherein said arm member includes a diaphragm in which said strain gauges are disposed.

3. The device for measuring acceleration as claimed in claim 2 wherein said plurality of strain gauges includes first and second strain gauges extending in the lengthwise direction of said arm member and third a fourth strain gauges extending in the breadthwise direction of said arm member.

4. A device for measuring acceleration comprising:

a coupling mechanism;

an arm member having first and second ends, the first end being fixed to said coupling mechanism, the arm member including a semiconductor material having a length and a breadth;

a weight attached to the second end of said arm member; and a plurality of strain gauges formed on said arm member wherein at least one of the plurality of strain gauges extends along the length of the arm member and at least one of the strain gauges extends across the breadth of said arm member, each strain gauge having a resistance that changes as said arm member is displaced due acceleration acting on said weight.

* * * * *

UNITED STATES PATENT AND TRADEMARK OFFICE
CERTIFICATE OF CORRECTION

PATENT NO. : 5,559,408
DATED : September 24, 1996
INVENTOR(S) : Araki

It is certified that error appears in the above-indentified patent and that said Letters Patent is hereby corrected as shown below: On the title page:

Item 62: Related U.S. Application Data; change

"June 3, 1991" to --June 13, 1991--.

Signed and Sealed this

Fourth Day of March, 1997

Attest:

BRUCE LEHMAN

Attesting Officer

Commissioner of Patents and Trademarks